United States Patent [19]

Warner

[11] Patent Number: 4,972,387
[45] Date of Patent: Nov. 20, 1990

[54] HIGH INFORMATION RATE CATACOUSTIC SYSTEM

[75] Inventor: Henry L. Warner, Panama City, Fla.

[73] Assignee: The United States of America as represented by the Secretary of the Navy, Washington, D.C.

[21] Appl. No.: 560,960

[22] Filed: Jun. 24, 1966

[51] Int. Cl.$^5$ .............................................. G01S 15/00
[52] U.S. Cl. ...................................... 367/106; 367/88
[58] Field of Search ........................... 340/3, 3 R, 3 T; 367/106, 88, 130, 99

[56] References Cited

U.S. PATENT DOCUMENTS 3,297,980  1/1967  Haslett ................................ 367/106

Primary Examiner—Thomas H. Tarcza
Assistant Examiner—Daniel T. Pihulic
Attorney, Agent, or Firm—Harvey David; John Becker; Sol Sheinbein

[57] ABSTRACT

A high information rate catacoustic system having a sonar transmitter disposed at a remote location from and facing a sonar receiver in such manner that forward-scattered echoes of sonic energy originally broadcast by said transmitter are reflected by and received from the sea floor by said receiver and displayed by a recorder connected thereto as an inverse function of the range from the sea floor to said transmitter.

5 Claims, No Drawings

HIGH INFORMATION RATE CATACOUSTIC SYSTEM

The invention described herein may be manufactured and used by or for the Government of the United States of America for governmental purposes without the payment of any royalties thereon or therefor.

This invention relates to catacoustic systems of the pulse-echo type which scan in range and display on a time base recorder as a function of range the reflected energy from a boundary interface such as the seabottom. More particularly the invention relates to a method and system which greatly decreases the time interval normally required by such catacoustic systems to scan a given range and hence greatly increases the area scan rate of such a system.

An object of the invention is to decrease the time interval normally required by catacoustic systems to scan or search a given range.

Another object of the invention is to provide a sector scanning system which will function at normal towing speeds without the need for information storage in the display system.

Still another object of the invention is to provide an apparatus employing acoustic wave energy under water for increasing the search range at a towing speed presently considered normal, i.e., 6 knots.

Catacoustic systems are known for using scanning techniques for locating objects under water and for presenting a shadowgraph or similar image indicating the approximate size and shape of the objects. A forward-looking scanning system is shown in U.S. Pat. No. 3,067,281, La Pierre et al, and a side-looking scanning system is shown in U.S. Pat. No. 3,005,973, Kietz. One known side-looking scanning system utilizes a high resolution transducer having a veritcally oriented fan shape beam directed at an oblique angle toward the bottom abeam of the ship, a transmitter for periodically energizing the transducer with high frequency pulses of very short duration, a receiver with suitable gain control for processing the responses of the transducer (or a separate hydrophone) to flutter echoes returned from the bottom into signals of nearly constant level and recording means responsive to said signals for synthesizing a two-dimensional visible display having line by line correlation with the forward movement of the ship and point by point correlation along a line of the ranges of the elemental bottom areas causing the returned echoes. Echoes from objects which protrude above the bottom a certain minimum height will be stronger than ordinary bottom reflections and no echo will be returned between the time the transmitted pulse passes the crest of the object and the time it again strikes the bottom beyond the object so that the object will appear on the display as a blank area immediately preceeded by a strong signal and followed by an ordinary bottom return signal. In a simple system utilizing a single scanning arrangement it is obvious that the interval between scansions can be no less than the round trip travel time from the transmitter to the farthest slant range and return to the receiver. Thus assuming a scanner 5 yards above the bottom, a beam width of about 0.2°, a scan range of 25 yards, and a pulse length of 50 microseconds the system will provide in water three-inch resolution in range and a resolution in azimuth of about three inches at 25 yards. Accordingly, to obtain successive scans along the bottom spaced apart approximately three inches, the speed of the ship is limited to about four knots. Any attempt to pulse with a higher repetition rate than determined by the round trip time interval results in multiple displays at different ranges for a single target.

In accordance with the present invention, a receiver is arranged remote from and facing a transmitter in such manner that forward-scatter energy or flutter echoes from the sea bottom are receiver and similarly displayed, with the important difference that the flutter echoes arrive at the receiver in succession as an inverse function of range from the transmitter. This inverse function prevails because the pulse of sonic energy from the transmitter reaches the near end of the area first and then wipes along the bottom to the farthest point of the scan whereas flutter echoes from the farthest point arrive first at the remote receiver followed in rapid succession by echoes from areas progressively closer to the near end and therefore each echo is received with range resolution as a function of time relative to the farthest point of the scan. Thus the time interval for a complete scan of a single pulse to arrive at the receiver depends upon the small differences in path lengths which the sound travels and since as explained below these path lengths differences are relatively small, the maximum transmitter repetition rate is determined by the compressed receiving period rather than the round trip time interval as mentioned above. This arrangement not only makes possible an increase in the repetition rate and hence the scanning rate by at least a factor of 10 but has the distinct advantage of providing a "2-shadow" display which greatly aids in the interpretation of the display. Also, with the arrangement according to the present invention a more complete representation of an object on the bottom is obtained in the display because a shadow appears both before and after the highlights caused by the object.

The invention will be understood from the following description when read in connection with the accompanying drawings in which:

FIG. 1 is a view in perspective of a known side-looking scanning system;

FIG. 2 is a side elevation of a system illustrating the operation of the invention;

FIG. 3 is a conventionalized representation indicating an operational environment of the system of FIG. 2;

FIGS. 4 and 5 are, respectively, block diagrams of depth and separation control systems for the vehicles shown in FIG. 3;

FIG. 6 is a schematic view showing an arrangement of the system of FIG. 2 for doubling the area being scanned; and FIGS. 7 and 8 show, respectively, side and plan views of a forward-looking sector scanning system according to the invention.

It is believed that the invention will be more readily understood by first describing a known scanning system such as is shown in FIG. 1 wherein a transducer 10 is shown extending down into a body of water 11 through the hull of a ship 12 for projecting compressional wave energy into the water and receiving echoes returned from a bottom 14. This transducer 10 has a vertically oriented fan-shaped directivity pattern 13 directed abeam of the ship 12 and having its principal axis directed toward the bottom of an angle of declivity chosen so that it intersects the water bed 14 at an athwartship distance approximately equal to half the range to be scanned. The transducer 10 is preferably mounted on an adjustable support (not shown) so that the transducer 10 may be positioned at the desired operating height above the bottom 14 to maintain approximately constant geometry so that the resulting display will be easily interpreted. Alternatively, the transducer 10 or the entire apparatus as hereinafter described, other than the recorder, may be towed astern in a bottom contour following vehicle so that a permanent installation aboard a ship would not be necessary. The transducer 10 is connected to transmit-receive and recording apparatus 15 aboard the ship 12 and may be constructed as disclosed by Phillip R. Anderson et al in their application Ser. No. 8,471 filed Feb. 12, 1960 and assigned to the assignee of the present invention. As therein disclosed the transducer 10 is periodically energized to emit short pulses 16 of acoustic energy in the directivity pattern indicated by the reference character 14. Separate transducers for transmitting and receiving may, of course, be employed with at least one of the transducers having the desired directivity pattern. The intersection of each pulse 16 with the bottom 14 wipes or travels outwardly along the bottom 14 so that the return echo signal due to bottom reflection is comparable to that received from flying spot scanning. As is disclosed in the above referenced Anderson et al application, flutter echoes received by the transducer 10 are recorded on a suitable record medium 17 which is preferably advanced at a rate directly correlated with the speed of the ship 12 to provide a known relation between distance traveled and the length of the record 17. A fugitive record displayed on a cathode ray tube may, of course, be utilized if a long term history of the area scanned is not desired.

The present invention as illustrated in FIG. 2 differs from the foregoing in that a transmitting transducer 20 which is pulsed as was transducer 10 to illuminate a section of the bottom 14 desired to be scanned is arranged remote from and facing a receiving transducer 21 so that forward-scattered energy or fluttr echoes from the bottom 14 within the disired search zone arrive in rapid sequence due to the small difference in path lengths which the acoustic energy travels. A pulse leaving the transducer 20 at point A wipes along the sea bottom 14 between points D and B and flutter echoes are forward-scattered to the receiver 21 at point C. The travel path from A to B to C is the shortest, while the path A to D to C is the longest, with a continuous increase of path lengths for points between B and D. It is thus apparent that the scanning is from B towards D. The difference in the path lengths AFB and ADC divided by the velocity of sound in water gives the time period during which the signal made up of flutter echoes from all reflectors between points D and B arrives at point C. This path length difference can be made very small thus allowing the transducer 20 to be pulsed at a repetition rate determined by the compressed receiving period rather than by the total time for sound to travel from A to C. As a consequence of the decrease in reception time for a given number of reflectors in the search path between points D and B the received frequency spectrum will be broadened and thus make it necessary to increase the bandwidth of a receiver 22 in inverse proportion to the compression of the receiving time period over the bandwidth used in a conventional system such as shown in FIG. 1. As shown in FIG. 2, the receiver 22, a transmitter 23 for pulsing the transducer 20, and the shipboard equipment 24 all are conventional.

In the embodiment shown in FIG. 2, the scanning catacoustic system may be considered as a side-looking type with the transducers 20 and 21 housed in two vehicles 25 and 26 (FIG. 3) spaced at twice the maximum range illuminated by the transmitting transducer 21 since otherwise there are points between B and E which if illuminated or sonified would yield path lengths the same as for points between B and D. As indicated in FIG. 3 the directivity pattern of the transducer 20 provides the desired azimuth resolution.

With the transducers 20 and 21 positioned 25 feet above the bottom 14 and separated a distance of 200 feet the approximately 100 foot path (D to B) is scanned and the signal received each 4.08 milliseconds. If the receiving transducer 21 were at the position of the transmitting transducer 20 as in FIG. 1 the 100 foot range would be scanned in 31.23 milliseconds although in practice a longer totoal time (about 41 milliseconds) is used to keep local volume reverberation from interfering with the reception of echoes from the maximum range. Thus an increase in transmission rate by a factor of 10 becomes possible using the remote receiver configuration of the present invention. This factor is adjustable since it depends on the geometry of the configuration, i.e., the receiver height above the bottom and the separation of the transducers. In general, as the separation of the transducers becomes large for a given height, the path length difference approaches the value of the height of the receiver.

As shown in FIG. 3, the vehicles 25 and 26 are towed in spaced relation by a conventional diverted towing array including port and starboard paravanes 27 and 28, respectively, and a tow ship 29 which carries the shipboard equipment 24, it being understood that the towing cables 30 include the necessary conductor wires.

The vehicles 25 and 26 are towed at a substantially constant height above the bottom by the controlling apparatus diagrammatically illustrated in FIG. 4 as comprising a sonic depth sounder 31 including a downwardly directed transducer 32 for producing a signal having a parameter corresponding to the distance the transducer 32 is above the bottom. This distance signal is fed to a comparer 33 which compares it with a voltage on a terminal 34 which has been preset to a value corresponding to the height it is desired for the vehicles 25 and 26 to ride through the water. When the comparer 33 detects an error signal between the output of the depth sounder 31 and the preset voltage on the terminal 34 the error signal is applied to a servo amplifier 35 which powers a servo motor 36 to adjust, through a suitable gear box 37, diving fins 38 mounted on each of the vehicles 25 and 26. When not under the control of the depth sounder 31 the diving fins 38 have a strong negative angle of attack whereby the vehicles 25 and 26 when moved through the water dive until they are close enough to the bottom for the sounder 31 to take control.

The spacing between the vehicles 25 and 26 may be accurately maintained by providing one of them, here shown as the vehicle 26, with a transponder 40 which answers when rung by a right-facing transducer 41 provided on the vehicle 25 which utilizes the answer for controlling a rudder 42 carried by the vehicle 25 maintain its distance from the vehicle 26 at a preselected constant value. Apparatus suitable for controlling this spacing of vehicles is shown in FIG. 5 as comprising a sonic echo ranger 43 including the right-facing transducer 41 for producing a signal having a parameter corresponding to the distance the vehicle 26 is from the transducer 41. This distance signal is compared by a comparer 44 with a voltage on a terminal 45 which has been preset at a value corresponding to the desired separation of the vehicles 25 and 26. Error signals between the output of the sonic ranger 43 and the preset voltage on the terminal 45 detected by the comparer 44 are applied to a servo amplifier 46 which powers a servo motor 47 to adjust through a suitable gear box 48 the rudder 42 of the vehicle 25 to maintain the preselected vehicle separation.

Inasmuch as it is desirable, as pointed out in the description of FIG. 2, to space the transmitting and receiving transducers by a distance approximately twice the range to be scanned, this additional spacing may be utilized as shown in FIG. 6 to add another scanning system for searching the bottom between the points B and E. In FIG. 6 the arrangement of FIG. 2 is designated to operate the transducer 20 and the transmitter 23 at a frequency of $f_1$ and the added scanning system is designated to operate at a frequency $f_2$, the corresponding components in the added system being designated by the same reference numerals primed. The transducer 21 at point C responds to $f_1$ flutter echoes from along the bottom between points B and D and the resulting electrical signal is passed through a receiver and TVG amplifier 50 to a helical recorder 51 which marks a suitable recording medium 52 in accordance with the received signals. A 2-shadow display of an object is indicated on the medium 52. In a similar manner, a transducer 20' at a point C' is pulsed by a transmitter 23' with energy having a frequency $f_2$ to sonify the ocean floor between the points B and E and the $f_2$ flutter echoes are received by a transducer 21' at a point A' with the resulting electrical signal being passed through a receiver and TVG amplifier 53 to a helical recorder 54 which marks a suitable record medium 55 in accordance with said signal. The two recorders 51 and 54 are preferably positioned to correspond to their relation with the portion of the ocean floor being scanned and, of course, may be so constructed that the recordings are contiguous so as to aid a visual interpretation thereof. In the interest of clarity supporting sources such as power and sync have been omitted.

The forward looking sector scan system diagrammatically shown in FIG. 7 has the geometrical configuration for providing the high information rate described above. As here shown a search ship 60 is provided with a transmitter 61 for periodically pulsing a transducer 62 to transmit short pulses 63 of acoustic energy at an oblique angle toward the bottom ahead of the ship 60. The transducer 62 has a cone-shape directivity pattern so that each pulse intersects a substantial area of the bottom such as, for example, the area indicated in FIG. 8 by a broken line 64. An ahead of ship vehicle 65 is provided with a receiving transducer 66 which effectively scans in a horizontal plane the flutter echoes coming from the bottom and furnishes electrical outputs corresponding to said echoes to a receiver 67 provided with a suitable display (not shown) for viewing aboard the ship 60. The scanning in range is from B towards D.

Conceivably the horizontal scanning function could be performed by rotating the transducer 66 about a vertical axis but inasmuch as many thousands of scans per second can be obtained electronically, this method is described. The desired scanning can be accomplished using a vertically split transducer 66 and a phase shifting arrangement equivalent to rotating the active face of the transducer, one such arrangement being disclosed in U.S. Pat. No. 2,666,192 to Hunt et al. Another scanning system principle is available in the AN/UQS-1 pulsed type mine detecting sonar which is standard equipment on all mine hunting ships in the U. S. Fleet. The AN/UQS-1 receiver comprises 23 pairs of transducers (46 crystals connected in doublets) which cover a sector 20° in azimuth and 10° in depression, each receiver pair having a directivity of approximately 2¼°. The outputs from the 23 transducer pairs are individually amplified and scanned in succession at the rate of a thousand times a second by a control system including a delay line scanner which operates the amplifiers as switches to connect their outputs to the grid of a plan position indicator (PPI) display tube.

The arrangement shown in FIG. 8 differs from that of FIG. 7 in that the transmitting transducer 62 may be considered to be located in the ahead of ship vehicle 65 and the receiving transducers 66 and 66' located on the search ship 60 adjacent a receiver-display system. The transmitter 61 energizes the transducer 62 to project into the water an acoustic pulse 63 which wipes along the bottom area 64 with forward scattered flutter echoes impinging on the receiving transducers 66 and 66'. Each wave front striking the transducer 66' is passed through an amplifier 70 to trigger a horizontal sweep circuit 71 to provide a linear sweep of a duration determined by the period (1/f) of the transmitted signal for a cathode ray display tube 72 having an intensity grid 73 connected through an amplifier 74 and a delay circuit 75 to the other receiving transducer 66. The circuit 75 which may comprise a multivibrator delays a marker pulse to the grid 73 for a time equal to half the horizontal sweep period. Thus if the signal pulse 63 has a frequency of 100 kc, the duration of the horizontal sweep will be 10 microseconds ($1/f = 1/10^5$) and the delay for marker pulse will be 5 microseconds. For each transmitted pulse the transmitter 61 furnishes a synchronization pulse to a vertical sweep generator 76 for the tube 72. The synchronization pulse may be delayed by a delay circuit 77 for a time interval about equal to the travel time of an acoustic pulse from the transducer 62 to the vertical sweep (displaying range) is made equal to the time difference of arrival between the shortest and longest paths; i.e., about 4 milliseconds in the above example. This permits 250 frames per second. To provide positional correlation between the object and the display the horizontal sweep must originate on the side of the display opposite to the receiving transducer producing the sweep signal, i.e., from left to right in FIG. 8, and the vertical sweep must start at the bottom corresponding to object position B.

The display tube 72 derives its horizontal sweep from the received echo signal and therefore has a repetition or sweep rate controlled by the individual wavelength periods. For a linear vertical sweep (displaying range) the resulting raster is a series of horizontal sweeps unequally spaced as determined by the instantaneous frequency of the signal in the horizontal sweep receiver channel 66'. The other receiver channel 66, carrying essentially the same signal but displaced and varying in time depending upon the angle to different targets, brightens the display on the tube 72 with the same unequalness in time as found in the horizontal sweep channel. A complex echo pulse arriving at the hydrophones is therefore displayed as a small spot on the display screen.

The intensity of the spot on the display due to an echo is determined by the number of individual display pulses occurring at nearly the same place so that they contribute energy to the same resolution element on the display screen. There is, by design of the system, a fixed voltage level intensity pulse associated with each cycle of the received wavefronts. For a strong target echo, compared with the other signals, the received wavefronts will arrive from the direction of the target so that all intensity pulses occur the same period of time after the horizontal sweep is triggered. This gives a compact, bright spot on the display because the vertical (range) sweep interval is about $10^5$ times longer than the horizontal sweep interval. For weaker target echoes compared with other signals, such as noise and reverberation, the angle of arrival of the echo wavefronts at the hydrophones fluctuates from moment to moment. This causes the fixed intensity pulses to fall further apart on the display screen and thus the target spot appears less bright. This technique is far simpler than using amplitude gates, etc., to restore a voltage level to the intensity pulse related to the absolute signal level, especially since the latter techniques must be largely by-passed in the practical display by some form of automatic gain control to keep the signal levels within a range that can be handled by the display.

It will be appreciated that the advantageous results provided by the present invention are not dependent upon the spaced facing transducers defining a straight line but that the principal axes of their directivity patterns may form any obtuse angle and still obtain all or at least most of the advantages provided by the invention. It will, of course, be understood that whether or not these axes lie in a single vertical plane or intersecting vertical planes forming an obtuse angle that they should intersect the bottom at approximately the mid-point of an area to be covered by a single scan as has been pointed out above in the descriptions of the several arrangements illustrated in the drawings.

What is claimed is:

1. In a pulse-echo catacoustic range scanning system for composing line by line a visual display of the flutter echoes returned from the sea bottom with the spot positions in the display being correlated with the positions of the echo origins, a scanning array comprising,
    two transducers submerged in the sea in spaced facing relation with the directivity pattern of each transducer having its principal axis slanted toward substantially the same point on the sea bottom and at least one of said directivity patterns having a vertically oriented fan shape,
    means for energizing one of said transducers to radiate a short pulse of sonic energy at a selected frequency,
    receiver means including the other of said transducers for developing electric signals corresponding to the flutter echoes of said short pulse impinging on said other transducer, and
    means connected to be actuated by said electric signals for displaying along sequential segments of a line visual markings in accordance with said electric signals.

2. A scanning array in accordance with claim 1 wherein
    said two submerged transducers are mounted in individual submarine vehicles laterally spaced in a towable spread.

3. A scanning array in accordance with claim 2 wherein
    said two submerged transducers have their principal axes directed toward a point on the sea bottom laterally spaced from said one of said transducers by a distance substantially equal to one-fourth the distance said two transducers are spaced.

4. A scanning array in accordance with claim 3 and further comprising,
    a third transducer mounted in the said vehicle in which the said other of said transducers is mounted,
    means for energizing said third transducer to radiate a short pulse of sonic energy at a frequency different from said selected frequency,
    means including a fourth transducer mounted in the said vehicle in which the said one of said transducers is mounted for developing electric signals corresponding to flutter echoes of said different frequency,
    said third and fourth transducers being so oriented that their principal axes are directed toward an intermediate point on the sea bottom spaced from said third transducer by a distance substantially equal to one-fourth the distance said third and fourth transducers are spaced, and
    means connected to be actuated by the electric signals of said different frequency for displaying along sequential segments of a line visual markings in accordance with said electric signals of said different frequency.

5. A scanning array in accordance with claim 1 wherein
    said one of said transducers has a cone-shape directivity pattern so that each radiated pulse intersects a substantial area of the bottom, and
    said receiver means effectively scans at a very rapid rate in a horizontal plane, whereby a sector scan is accomplished with resolution in range provided by the length of the radiated pulse and resolution in azimuth provided by the horizontal scanning by the receiver means.

* * * * *